United States Patent
Mason et al.

(10) Patent No.: US 10,233,100 B2
(45) Date of Patent: Mar. 19, 2019

(54) METHODS FOR INACTIVATING MOSQUITO LARVAE USING AQUEOUS CHLORINE DIOXIDE TREATMENT SOLUTIONS

(71) Applicant: SABRE INTELLECTUAL PROPERTY HOLDINGS LLC, Slingerlands, NY (US)

(72) Inventors: John Y. Mason, Slingerlands, NY (US); Julian N. Rosenberg, Naugatuck, CT (US)

(73) Assignee: Sabre Intellectual Property Holdings LLC, Slingerlands, NY (US)

( * ) Notice: Subject to any disclaimer, the term of this patent is extended or adjusted under 35 U.S.C. 154(b) by 99 days.

(21) Appl. No.: 15/629,341

(22) Filed: Jun. 21, 2017

(65) Prior Publication Data

US 2018/0009684 A1  Jan. 11, 2018

Related U.S. Application Data

(60) Provisional application No. 62/352,932, filed on Jun. 21, 2016.

(51) Int. Cl.
*C02F 1/50* (2006.01)
*C02F 1/76* (2006.01)
*C02F 103/00* (2006.01)

(52) U.S. Cl.
CPC .............. *C02F 1/50* (2013.01); *C02F 1/76* (2013.01); *C02F 2103/007* (2013.01); *C02F 2209/04* (2013.01); *C02F 2209/29* (2013.01)

(58) Field of Classification Search
CPC .......... C02F 1/50; C02F 1/76; C02F 2209/04; C02F 2209/29; C02F 2103/007
See application file for complete search history.

(56) References Cited

U.S. PATENT DOCUMENTS

| | | |
|---|---|---|
| 6,343,653 B1 | 2/2002 | Mason et al. |
| 6,468,479 B1 | 10/2002 | Mason et al. |
| 6,645,457 B2 | 11/2003 | Mason et al. |
| 7,678,388 B2 | 3/2010 | Mason |

(Continued)

FOREIGN PATENT DOCUMENTS

| | | |
|---|---|---|
| WO | WO 2017/019685 | 2/2017 |
| WO | WO 2017/106685 | 6/2017 |
| WO | WO 2017/106696 | 6/2017 |

OTHER PUBLICATIONS

Sun, Xing-Bin, et al., "Inactivation of Chironomid larvae with chlorine dioxide", Journal of Hazardous Materials, vol. 142, Issues 1-2, pp. 348-353, Apr. 2007.

(Continued)

*Primary Examiner* — Lucas A Stelling
(74) *Attorney, Agent, or Firm* — Hamilton, Brook, Smith & Reynolds, P.C.

(57) ABSTRACT

Provided herein are methods of inactivating a mosquito larva, the methods comprising exposing the larva to an aqueous chlorine dioxide treatment solution for a minimum contact time, wherein the aqueous chlorine dioxide treatment solution comprises a residual chlorine dioxide concentration at the conclusion of the minimum contact time. Also provided herein are methods of treating a body of water containing a mosquito larva. The methods are effective to inactivate the larva, thereby preventing growth of mosquito populations and the related spread of mosquito-borne disease.

17 Claims, 1 Drawing Sheet

(56) References Cited

U.S. PATENT DOCUMENTS

| | | |
|---|---|---|
| 7,807,101 B2 | 10/2010 | Mason |
| 8,192,684 B2 | 6/2012 | Mason et al. |
| 8,609,594 B2 | 12/2013 | Mason |
| 8,703,656 B2 | 4/2014 | Mason |
| 8,741,223 B2 | 6/2014 | Mason et al. |
| 9,238,587 B2 | 1/2016 | Mason |
| 2014/0271355 A1 | 9/2014 | Mason |

OTHER PUBLICATIONS

Kumar, S., et al., "Oxidative stress induced by chlorine dioxide as an insecticidal factor to the Indian meal moth, *Plodia interpunctella*", Pestic Biochem Physiol, 124:48-59, Oct. 2015.

METHODS FOR INACTIVATING MOSQUITO LARVAE USING AQUEOUS CHLORINE DIOXIDE TREATMENT SOLUTIONS

RELATED APPLICATIONS

This application claims the benefit of U.S. Provisional Application No. 62/352,932 filed on Jun. 21, 2016. The entire teachings of the above application(s) are incorporated herein by reference.

BACKGROUND

Millions of people die or suffer severe impairments due illnesses spread by mosquitoes, such as malaria, dengue virus, West Nile Virus, and Zika virus. Mosquito populations spread quickly and spend the early stages of their lifecycle predominantly in standing water, including local bodies of stagnant water such as puddles and backyard ponds. Many commercially available larvicides can be toxic and pose safety risks for the public, particularly children, when used in local bodies of water. There is a need for safe, non-toxic methods for controlling growth of mosquito larvae. The present disclosure relates to nontoxic methods for quickly inactivating mosquito larvae.

SUMMARY

In one aspect provided herein is a method of treating a mosquito larva, the method comprising exposing the larva to an aqueous chlorine dioxide treatment solution for a minimum contact time of 5 minutes, wherein the aqueous chlorine dioxide treatment solution comprises a residual chlorine dioxide concentration of at least 2.5 ppm (e.g., at least 5 ppm or at least 10 ppm) at the conclusion of the minimum contact time.

In some embodiments, the method comprises making the aqueous chlorine dioxide treatment solution by adding to dilution water a concentrated liquid chlorine dioxide solution. In some embodiments, the concentrated liquid chlorine dioxide solution comprises at least 500 ppm chlorine dioxide. In some embodiments, the dilution water comprises water from a puddle, bird bath, pond, lake, reservoir, drainage ditch containing water, or culvert containing mosquito larvae.

In some embodiments, the method further comprises determining an estimated demand of the dilution water. In some embodiments, the estimated demand is determined by assessing demand in a sample of the dilution water that is collected before the concentrated liquid chlorine dioxide solution is added to the dilution water. In some embodiments, the method further comprises collecting the sample of the dilution water before the concentrated liquid chlorine dioxide solution is added to the dilution water.

In some embodiments, the adding to dilution water a concentrated liquid chlorine dioxide solution comprises (i) determining, based on the estimated demand of the dilution water and a target residual chlorine dioxide concentration, a dose of chlorine dioxide to be established in the aqueous chlorine dioxide treatment solution and (ii) adding to the dilution water a volume of concentrated liquid chlorine dioxide solution that is calculated to initially provide said dose of chlorine dioxide in the aqueous chlorine dioxide treatment solution. Typically, the determining consists of summing the estimated demand with a target residual chlorine dioxide concentration. In some embodiments, the target residual chlorine dioxide concentration is 2.5 ppm to 50 ppm (e.g., 5 ppm to 50 ppm or 10 ppm to 50 ppm).

In some embodiments, the method comprises spraying at least part of (e.g., all of) said volume over the dilution water.

In some embodiments, the method comprises agitating (e.g., stirring) the dilution water during or after adding the concentrated liquid chlorine dioxide solution.

In some embodiments, the method further comprises assessing residual chlorine dioxide concentration in the aqueous chlorine dioxide treatment solution at the conclusion of the minimum contact time. This allows verification that the target residual chlorine dioxide concentration has been attained in the aqueous chlorine dioxide treatment solution.

In another aspect provided herein is a method of treating a body of water containing a mosquito larva, the method comprising (a) taking a sample from a body of water containing a mosquito larva, (b) determining an estimated demand of the body of water by assessing demand in the sample, (c) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, wherein determining the dose comprises summing the estimated demand with a target residual chlorine dioxide concentration of at least 2.5 ppm (e.g., a target residual chlorine dioxide concentration of 2.5 ppm to 50 ppm), and (d) adding a volume of a concentrated liquid chlorine dioxide solution comprising at least 500 ppm chlorine dioxide to the body of water, thereby forming an aqueous chlorine dioxide treatment solution, wherein said volume is calculated to initially provide said dose in the aqueous chlorine dioxide treatment solution.

In some embodiments, the method comprises spraying at least part (e.g., most or all) of said volume over the body of water.

In some embodiments, the method comprises agitating (e.g., stirring) the body of water during or after adding the concentrated liquid chlorine dioxide solution.

In some embodiments, the method further comprises assessing residual chlorine dioxide concentration in the aqueous chlorine dioxide treatment solution at the conclusion of a minimum contact time (e.g., a minimum contact time of 5 minutes that begins once the volume has been added).

In another aspect provided herein is a method of treating a body of water containing a mosquito larva, the method comprising (a) taking a sample from a body of water containing a mosquito larva, (b) determining an estimated demand of the body of water by assessing demand in the sample, (c) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, (d) adding a volume of a concentrated liquid chlorine dioxide solution comprising at least 500 ppm chlorine dioxide to the body of water, thereby forming an aqueous chlorine dioxide treatment solution, wherein said volume is calculated to initially provide said dose in the aqueous chlorine dioxide treatment solution, and (e) assessing residual chlorine dioxide concentration in the aqueous chlorine dioxide treatment solution at the conclusion of a minimum contact time (e.g., a minimum contact time of 5 minutes) and verifying that the aqueous chlorine dioxide treatment solution has a residual chlorine dioxide concentration (e.g., a residual chlorine dioxide concentration of at least 2.5 ppm, e.g., a residual chlorine dioxide concentration of 2.5 ppm to 50 ppm).

In some embodiments, assessing residual chlorine dioxide comprises inserting an ORP probe into the aqueous chlorine dioxide treatment solution and measuring the ORP of the aqueous chlorine dioxide treatment solution.

In another aspect provided herein is a method of treating a body of water containing a mosquito larva, the method comprising (a) determining an estimated demand of a body of water containing a mosquito larva (e.g., by assessing demand in a sample taken from the body of water), (b) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, wherein determining the dose comprises summing the estimated demand with a target residual chlorine dioxide concentration of at least 2.5 ppm (e.g., a residual chlorine dioxide concentration of 2.5 to 50 ppm), and (c) adding a volume of a concentrated liquid chlorine dioxide solution comprising at least 500 ppm chlorine dioxide into the body of water thereby forming an aqueous chlorine dioxide treatment solution, wherein said volume is calculated to initially provide said dose in the aqueous chlorine dioxide treatment solution.

In another aspect provided herein is a method of treating a body of water containing a mosquito larva, the method comprising (a) measuring an initial ORP in the body of water prior to treatment, (b) adding a concentrated liquid solution of chlorine dioxide to the body of water thereby forming a treated body of water, (c) monitoring ORP in the treated body of water during the adding, and (d) ceasing the adding when the ORP in the treated body of water reaches a level indicates that a residual concentration of chlorine dioxide (e.g., of at least 2.5 ppm) is present in the water.

In another aspect provided herein is a method of treating a body of water containing a mosquito larva, the method comprising (a) introducing an amount of chlorine dioxide into a body of water, thereby forming an aqueous chlorine dioxide treatment solution, wherein said amount is calculated to initially provide a dose of chlorine dioxide in the aqueous chlorine dioxide treatment solution, wherein the dose is calculated by summing the estimated demand of the body of water with a target residual chlorine dioxide concentration of at least 2.5 ppm and (b) exposing the larva to the aqueous chlorine dioxide treatment solution for a minimum contact time of 5 minutes, wherein the aqueous chlorine dioxide treatment solution comprises a residual chlorine dioxide concentration of at least 2.5 ppm at the conclusion of the minimum contact time. In some embodiments, the target residual chlorine dioxide concentration is at least 5 ppm and the aqueous chlorine dioxide treatment solution comprises a residual chlorine dioxide concentration of at least 5 ppm at the conclusion of the minimum contact time. In some embodiments, the target residual chlorine dioxide concentration is at least 10 ppm and the aqueous chlorine dioxide treatment solution comprises a residual chlorine dioxide concentration of at least 10 ppm at the conclusion of the minimum contact time.

In another aspect provided herein is a method of treating a body of water containing a mosquito larva, the method comprising (a) taking a sample from a body of water containing a mosquito larva, (b) determining an estimated demand of the body of water by assessing demand in the sample, (c) determining, based on the estimated demand and a target residual chlorine dioxide concentration, a dose of chlorine dioxide to be established in an aqueous chlorine dioxide treatment solution to be formed by adding chlorine dioxide to the body of water, wherein determining the dose comprises summing the estimated demand with a target residual chlorine dioxide concentration of at least 2.5 ppm, and (d) introducing an amount of chlorine dioxide into the body of water, thereby forming the aqueous chlorine dioxide treatment solution, wherein said amount is calculated to initially provide said dose in the aqueous chlorine dioxide treatment solution. In some embodiments, the target residual chlorine dioxide concentration is at least 5 ppm. In some embodiments, the target residual chlorine dioxide concentration is at least 10 ppm.

DETAILED DESCRIPTION

Figure 1:
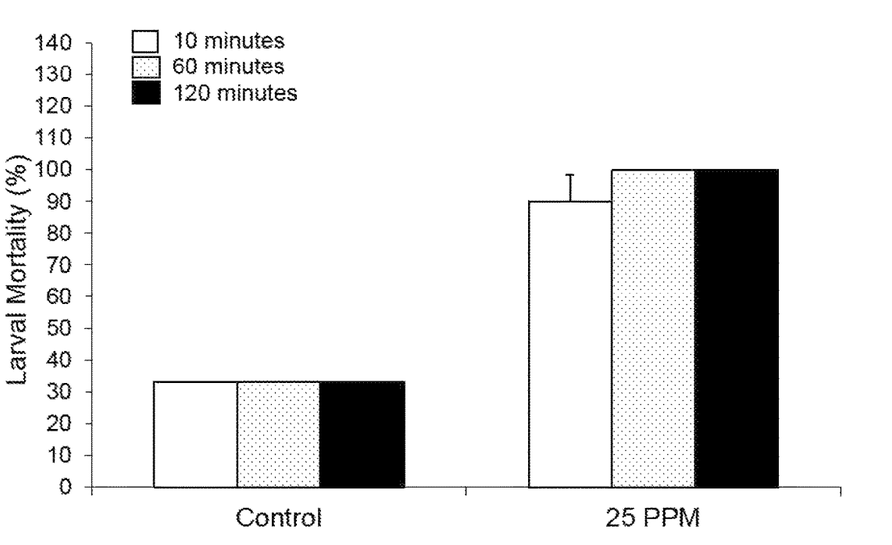
The FIGURE shows inactivation of mosquito larvae following exposure to chlorine dioxide for the indicated contact time.

A description of example embodiments follows.

The teachings of all patents, published applications and references cited herein are incorporated by reference in their entirety.

As used herein, singular terms such as "a," "an," or "the" are intended to encompass the plural, unless the context clearly indicates otherwise. For example, as used herein, treating "a mosquito larva" encompasses treating a population of mosquito larvae.

As used herein and in the art, "ppm" refers to parts per million. In the describing liquid solutions comprising chlorine dioxide, the present specification employs the term "ppm" to refer to parts per million by weight.

As used herein, "contact time" is the time during which a mosquito larva is exposed to (e.g., contacted with) a specified solution. Typically, the contact time is a continuous period of time.

As used herein, "minimum contact time" is the minimum time during which a mosquito larva is exposed to (e.g., contacted with) an aqueous chlorine dioxide treatment solution (e.g., a treated body of water), typically, having a chlorine dioxide concentration of at least as high as a specified residual concentration. Thus, for example, a minimum contact time of x minutes means that the larva is exposed to the specified solution for a period of at least x minutes. In many embodiments, the specified solution is an aqueous solution comprising a specified residual chlorine dioxide concentration. Unless otherwise indicated, the residual chlorine dioxide concentration is assessed at the conclusion of a contact time (e.g., at the conclusion of a minimum contact time). The initial chlorine dioxide concentration typically is higher than the specified residual chlorine dioxide concentration, because the chlorine dioxide concentration decreases over time as the chlorine dioxide reacts with (e.g., oxidizes) mosquito larvae and typically also other biological and chemical contaminants that exist in dilution water in which the mosquito larvae are present.

As used herein, "demand" refers to chlorine dioxide demand. Demand typically refers to the concentration of chlorine dioxide (typically expressed in ppm or mg/L) that is consumed by a fluid when chlorine dioxide is added to the fluid. Chlorine dioxide is consumed, at least in part, because it reacts with chemical and biological contaminants in the fluid. The demand of a liquid is preferably determined using iodometric titration.

As used herein and in the art, "residual" chlorine dioxide concentration refers to the concentration of unreacted chlorine dioxide that is present in a fluid after chlorine dioxide that has been introduced into the fluid has reacted with contaminants (such contaminants can include biological or chemical contaminants). As used herein, unless the context clearly indicates otherwise, residual chlorine dioxide concentration refers to the concentration of chlorine dioxide that is present in a treatment solution (e.g., a treated body of water) at the conclusion of a minimum contact time during which a mosquito larva (e.g., a population of mosquito larvae) has been exposed to the solution.

The concentration of chlorine dioxide can be assessed directly or indirectly. In preferred embodiments, the concentration of chlorine dioxide is determined by Method 4500-ClO2 E ("Amperometric Method II") in the "Standard Methods for the Examination of Water and Wastewater," 20th ed., 1998, or an equivalent method.

In some embodiments, the residual concentration of chlorine dioxide is assessed using iodometric titration. In other embodiments, the residual concentration of chlorine dioxide is assessed using an electrochemical measuring device (e.g., the Palintest ChlordioX Plus device).

In other embodiments, the residual concentration of chlorine dioxide is assessed by measuring the oxidation reduction potential (ORP) (also known as redox potential). An ORP meter can be used to measure the ORP of a solution. ORP meters are commercially available, e.g., from HANNA® Instruments. Measuring ORP allows indirect assessment of the concentration of chlorine dioxide in the solution. The ORP that corresponds to a particular concentration of chlorine dioxide is known in the art. A sensor or meter (e.g., an ORP sensor or meter) for assessing chlorine dioxide concentration can be calibrated by assessing solutions of known chlorine dioxide concentration.

Provided herein are methods for inactivating mosquito larvae using aqueous solutions of chlorine dioxide. The methods are safe and non-toxic. They can be used to prevent the growth of mosquito populations and the related spread of mosquito-borne disease. The methods are fast-acting and are effective to inactivate mosquito larvae within very short timeframes. In some embodiments, the methods are effective to inactivate mosquito larvae within 5 minutes or less, 10 minutes or less, 20 minutes or less, 30 minutes or less, or 1 hour or less.

Concentrated Liquid Solutions of Chlorine Dioxide

The aqueous solutions of chlorine dioxide used in the methods described herein are typically prepared by introducing a concentrated liquid solution of chlorine dioxide into dilution water.

In some embodiments, the concentrated liquid chlorine dioxide solution is made using a chlorine dioxide generator (e.g., a generator as disclosed in U.S. Pat. Nos. 6,486,479 and/or 6,645,457). In some embodiments, the concentrated liquid chlorine dioxide solution is a solution as described in U.S. Pat. No. 7,678,388. Chlorine dioxide solutions can also be prepared using other methods, e.g., methods known in the art.

In some embodiments, the concentrated liquid chlorine dioxide solution is an aqueous solution that comprises chlorine dioxide and a chlorine scavenging means (e.g., chlorite, e.g., sodium chlorite) for converting dissolved chlorine to chlorine dioxide. In some embodiments, the chlorine scavenging means comprises chlorite. In some embodiments, the chlorine scavenging means comprises sodium chlorite. In some embodiments, the chlorine scavenging means is sodium chlorite. In some embodiments, the concentrated liquid chlorine dioxide solution is an aqueous solution that is prepared to initially have a chlorine dioxide concentration of 1000 to 3000 mg/L (e.g., 2000 to 3000 mg/L), a pH of 1 to 6 (e.g., about 5 to 6), and a ratio of chlorine scavenging means:chlorine dioxide in the range of about 1:4 to 1:15 (w/w) (e.g., about 1:10 to1:15, e.g., about 1:13) based on a sodium chlorite to chlorine dioxide system. In some embodiments, the chlorine scavenging means comprises sodium chlorite. In some embodiments, the chlorine scavenging means is sodium chlorite. In some embodiments, the initial concentration of chlorine dioxide in the concentrated liquid chlorine dioxide solution decreases by less than 10% after two days of storage at room temperature and at normal atmospheric pressure. In some embodiments, the initial concentration of chlorine dioxide in the concentrated liquid chlorine dioxide solution decreases by less than 10% after 45 days of storage at room temperature and at normal atmospheric pressure. In some embodiments, the initial concentration of chlorine dioxide in the concentrated liquid chlorine dioxide solution decreases by less than 10% after 90 days of storage at room temperature and at normal atmospheric pressure.

In some embodiments, the concentrated liquid chlorine dioxide solution is an aqueous solution that is prepared to initially have a chlorine dioxide concentration of about 2000 to 3000 mg/L, a pH of about 5 to 6, and a ratio of sodium chlorite:chlorine dioxide in the range of about 1:4 to 1:15 (w/w).

In some embodiments, the concentrated liquid chlorine dioxide solution is an aqueous solution that is prepared to initially have a chlorine dioxide concentration of 10 to 3000 mg/L of water (e.g., from 1000 to 2500 mg/L), a chlorite ion concentration of 1 to 3000 mg/L of water (e.g., from 100 to 1000 mg/L), and optionally, a pH of 1 to 6.5 (e.g., a pH of 5 to 6).

Typically, the concentrated liquid chlorine dioxide solution is an aqueous solution. In some embodiments, the aqueous solution comprises at least 80%, 85%, 90%, 95%, 96%, 97%, 98%, or 99% water by weight. In some embodiments, the concentrated liquid chlorine dioxide solution has an initial chlorine dioxide concentration of 500-3500 ppm, 1000 to 3500 ppm, 1000 to 3000 ppm, 2800 to 3200 ppm, or about 3000 ppm. In some embodiments, the concentrated liquid chlorine dioxide solution is an aqueous solution having an initial chlorine dioxide concentration of about 3000 ppm. Optionally, the concentrated liquid chlorine dioxide solution can further comprise chlorite (e.g., sodium chlorite). The chlorite can act as a chlorine scavenger. In some embodiments, the initial chlorite concentration is 1 ppm to 3000 ppm (e.g., 100 ppm to 1000 ppm). In some embodiments, the initial chlorite:chlorine dioxide ratio (w/w) in the solution is 1:4 to 1:15 (e.g., about 1:10 to1:15). In some embodiments, the initial chlorite concentration in the solution is 200 ppm to 750 ppm.

In some embodiments, the concentrated liquid chlorine dioxide comprises at least 90% by weight of chlorine dioxide with respect to all chlorine species. In some embodiments, the concentrated liquid chlorine dioxide comprises at least 95% by weight of chlorine dioxide with respect to all chlorine species. In preferred embodiments, the concentration of chlorine dioxide is determined by Method 4500-$ClO_2$ E ("Amperometric Method II") in the "Standard Methods for the Examination of Water and Wastewater," 20th ed., 1998, or an equivalent method.

In some embodiments, the concentrated liquid chlorine dioxide solution is an aqueous solution comprising 500-3500 ppm chlorine dioxide and 100 to 1000 ppm chlorite. In some embodiments, the concentrated liquid chlorine dioxide solution has a pH of 1 to 6 (e.g., 4 to 6, e.g., 5 to 6).

In some embodiments, the concentrated liquid chlorine dioxide solution is an aqueous solution that comprises a chlorine dioxide concentration of 200 to 10,000 mg/L (e.g., 500 to 10,000 mg/L) and has a pH of 1 to 8 (e.g., about 5 to 8, e.g., about 6 to 8). In some embodiments, the concentrated liquid chlorine dioxide solution is prepared to include a chlorine scavenging means (e.g., chlorite, e.g., sodium chlorite). In some embodiments, the concentrated liquid chlorine dioxide solution comprises sodium chlorite, wherein the solution is prepared such that the ratio of sodium chlorite: chlorine dioxide is initially in the range of about 1:4 to 1:15 (w/w) (e.g., about 1:10 to1:15, e.g., about 1:13).

In some embodiments, the concentrated liquid chlorine dioxide solution is refrigerated or otherwise maintained at a temperature less than 25° C. to prevent thermochemical degradation of chlorine dioxide.

Methods

In one aspect provided herein is a method of treating a mosquito larva, the method comprising exposing the larva to an aqueous chlorine dioxide treatment solution for a minimum contact time (e.g., a minimum contact time of 5 minutes), wherein the aqueous chlorine dioxide treatment solution comprises a residual chlorine dioxide concentration (e.g., a residual chlorine dioxide concentration of at least 2.5 ppm) at the conclusion of the minimum contact time.

In some embodiments, the residual chlorine dioxide concentration is 2.5 to 50 ppm. In some embodiments, the residual chlorine dioxide concentration is at least 5 ppm. In some embodiments, the residual chlorine dioxide concentration is 5 to 50 ppm. In some embodiments, the residual chlorine dioxide concentration is 5 to 25 ppm. In some embodiments, the residual chlorine dioxide concentration is 5 to 15 ppm. In some embodiments, the residual chlorine dioxide concentration is at least 10 ppm.

In some embodiments, the minimum contact time is 5 minutes to 12 hours. In some embodiments, the minimum contact time is 10 minutes to 12 hours. In some embodiments, the minimum contact time is 10 minutes. In some embodiments, the minimum contact time is 15 minutes. In some embodiments, the minimum contact time is 20 minutes. In some embodiments, the minimum contact time is 30 minutes. In some embodiments, the minimum contact time is 45 minutes. In some embodiments, the minimum contact time is 1 hour. In some embodiments, the minimum contact time is 2 hours. In some embodiments, the minimum contact time is 4 hours, 6 hours, 8 hours, or 12 hours. In some embodiments, the minimum contact time is 24 hours.

In some embodiments, a method disclosed herein is effective to inactivate at least 80%, 90%, 95% of a treated population of mosquito larvae (e.g., a population present in a body of water prior to treatment of the body of water according to a method disclosed herein). In some embodiments, a method disclosed herein is effective to inactivate at least 96%, 97%, 98%, or 99% of a treated population of mosquito larvae. In some embodiments, a method disclosed herein is effective to inactivate 100% of a treated population of mosquito larvae. As used herein, a method is considered to "inactivate" mosquito larvae if the mosquito larvae exhibit lack of visible motion as assessed by visual observation with the naked eye and under a light microscope at 10x magnification. Preferably, the observation of the mosquito larvae to assess motion is performed after a minimum contact time, e.g., at the conclusion of a minimum contact time. Typically, a method disclosed herein is effective to inactivate mosquito larvae within a minimum contact time, e.g., a minimum contact time disclosed herein. In some embodiments, a method disclosed herein is effective to inactivate mosquito larvae within 5 minutes, 10 minutes, 15 minutes, or 20 minutes.

In some embodiments, a method described herein further comprises taking a sample of a treated body of water including treated mosquito larvae to verify the efficacy of the method. The sample is typically taken after a minimum contact time, e.g., at the conclusion of a minimum contact time. The mosquito larvae can be assessed visually and under a light microscope (e.g., at 10× magnification) to assess inactivation of the mosquito larvae.

In some embodiments, the larvae to be treated according to the methods disclosed herein are species of the *Culex* or *Aedes* generae (e.g., *A. aegypti* or *A. albopictus* larvae).

In some embodiments, the method further comprises introducing chlorine dioxide (e.g., a concentrated aqueous solution of chlorine dioxide) into dilution water to form the aqueous chlorine dioxide treatment solution. The amount of chlorine dioxide can be calculated to provide a desired dose of chlorine dioxide in the aqueous chlorine dioxide treatment solution. In some embodiments, the dose is calculated by summing an estimated chlorine dioxide demand of the dilution water with the residual chlorine dioxide concentration. In some embodiments, the method further comprises determining the dose. In some embodiments, determining the dose comprises summing an estimated chlorine dioxide demand of the dilution water with the residual chlorine dioxide concentration. The estimated chlorine dioxide demand can be determined as described herein.

In some embodiments, a method disclosed herein further comprises making the aqueous chlorine dioxide treatment solution by adding to dilution water a concentrated liquid chlorine dioxide solution. In some embodiments, the concentrated liquid chlorine dioxide solution comprises at least 200, 300, 400, or 500 ppm chlorine dioxide. In some embodiments, the concentrated liquid chlorine dioxide solution comprises at least 500 ppm chlorine dioxide.

In some embodiments, the concentrated liquid chlorine dioxide solution is an aqueous solution that further comprises chlorite, wherein the ratio of chlorite:chlorine dioxide is 1:4 to 1:15 (w/w).

In some embodiments, the concentrated liquid chlorine dioxide solution is an aqueous solution that is initially prepared such that it includes 500 to 3000 ppm (e.g., 1000 to 3000 ppm) chlorine dioxide and 100 to 1000 ppm chlorite (e.g., sodium chlorite) and optionally has a pH of 5 to 6.

In some embodiments, the concentrated liquid chlorine dioxide solution is used within 90 days of its preparation. In some embodiments, the concentrated liquid chlorine dioxide solution is used within 45 days of its preparation.

As used herein, an "aqueous solution" is a solution that consists of more than 50% water by weight. In some embodiments, the aqueous solution comprises at least 60%, 70%, 80%, 90%, 95%, 96%, 97%, 98%, or 99% water by weight.

Dilution water can be from any available source of water. In some embodiments, the dilution water comprises water from a body of water in which mosquito larvae are present. In some embodiments, the dilution water comprises water from a body of water in which mosquito larvae are reasonably expected to be present. In some embodiments, the dilution water is water near the surface of the body of water, e.g., water within 1 inch, 2 inches, 3 inches, 4 inches, 5 inches, 6 inches, 12 inches or 18 inches of the surface. Typically, the body of water is an outdoor body of water, such as, e.g., a puddle, bird bath, pond, lake, reservoir, drainage ditch containing water, or culvert containing water. In some embodiments, the body of water is a marsh or swamp. In some embodiments, the dilution water is a body of water in which mosquito larvae are present. In some embodiments, the dilution water is a body of water in which mosquito larvae are reasonably expected to be present. In some embodiments, the body of water is a standing body of water, e.g., a puddle, bird bath, pond, lake, or reservoir. As used herein, a "standing body of water" refers to a body of water that is stagnant or slow moving and in which mosquito larvae can live. A standing body of water does not have a significant continuous flow and accordingly does not encompass streams or rivers, although it encompasses isolated eddies away from the main flow of a river or stream.

As a person of skill in the art would recognize, if the dilution water comprises contaminants (such as, e.g., bacteria, viruses, algae, sulfides, etc.), a larger initial dose of chlorine dioxide will need to be added to the dilution water to make an aqueous chlorine dioxide treatment solution that comprises a specified residual concentration of chlorine dioxide compared with the dose that would be required to achieve the same residual concentration if the dilution water did not comprise contaminants. Dilution water that comprises contaminants has a higher chlorine dioxide demand. Accordingly, in many embodiments, a dose of chlorine dioxide is utilized that is calculated to initially provide a higher dose in an aqueous chlorine dioxide treatment solution than is expected to be present as a residual in the aqueous chlorine dioxide treatment solution at the conclusion of a minimum contact time. As disclosed herein, a dose of chlorine dioxide to be initially included in the aqueous chlorine dioxide solution can be determined, e.g., by summing the estimated chlorine dioxide demand of the dilution water with the chlorine dioxide residual. The dose should be at least as high as the sum of the estimated chlorine dioxide demand of the dilution water and the target chlorine dioxide residual.

In some embodiments, a method disclosed herein further comprises taking a sample from the dilution water (e.g., from the body of water) for the purpose of determining an estimated chlorine dioxide demand in the dilution water (e.g., in the body of water). In some embodiments, the method further comprises determining an estimated demand of the dilution water by assessing chlorine dioxide demand in the sample. In some embodiments, the sample comprises a plurality of samples. In some embodiments, members of the plurality of sample are taken from different locations in the dilution water (e.g., in the body of water).

In some embodiments, a method disclosed herein comprises determining an estimated demand of the dilution water by assessing chlorine dioxide demand in a sample of the dilution water that is collected before the concentrated liquid chlorine dioxide solution is added to the dilution water. In some embodiments, the method further comprises collecting the sample of the dilution water before the concentrated liquid chlorine dioxide solution is added to the dilution water. In some embodiments, the sample comprises a plurality of samples. In some embodiments, members of the plurality of samples are taken from different locations in the dilution water (e.g., in the body of water). The members of the plurality of samples can be taken from locations where mosquito larvae are present or expected to be present, e.g., near the surface of the water. In some embodiments, the members of the plurality of samples are taken within 18 inches, 12 inches, 6 inches, 5 inches, 4 inches, 3 inches, 2 inches, or 1 inch of the surface of the dilution water (e.g., the body of water).

In some embodiments wherein the sample comprises a plurality of samples, the estimated demand of the dilution water is determined as the average demand or median demand in the plurality of samples. The average demand is preferably utilized if the values are normally distributed and the median demand is preferably utilized if the values are not normally distributed.

In some embodiments, adding to dilution water a concentrated liquid chlorine dioxide solution comprises (i) determining, based on the estimated demand of the dilution water and a target residual chlorine dioxide concentration, a dose of chlorine dioxide to be established in the aqueous chlorine dioxide treatment solution and (ii) adding to the dilution water a volume of concentrated liquid chlorine dioxide solution that is calculated to initially provide said dose of chlorine dioxide in the aqueous chlorine dioxide treatment solution.

In one embodiment, said determining comprises summing the estimated demand of the dilution water with the target residual chlorine dioxide concentration. In one embodiment, said determining consists of summing the estimated demand of the dilution water with the target residual chlorine dioxide concentration.

To clarify such embodiments by way of example, if the estimated demand of the dilution water were 10 ppm and the target residual chlorine dioxide concentration were 10 ppm, typically a dose of at least about 20 ppm chlorine dioxide would need to be initially established in the aqueous chlorine dioxide treatment solution to result in an actual residual of approximately 10 ppm once the estimated demand has been satisfied. Assuming that a concentrated liquid chlorine dioxide solution comprising a concentration of 1000 ppm chlorine dioxide were used and dilution water having a volume of 10 liters were used, a volume of about 200 mL of the concentrated liquid chlorine dioxide would be calculated to initially provide the 20 ppm dose (200 mL of 1000 mg/L chlorine dioxide would provide 200 mg of chlorine dioxide, which in a volume of 10.2 L would be about 20 mg/L).

In some embodiments, the target residual chlorine dioxide concentration is 2.5 to 50 ppm. In some embodiments, the target residual chlorine dioxide concentration is at least 5 ppm. In some embodiments, the target residual chlorine dioxide concentration is 5 to 25 ppm. In some embodiments, the target residual chlorine dioxide concentration is 5 to 15 ppm. In some embodiments, the target residual chlorine dioxide concentration is at least 10 ppm. In some embodiments, the target residual chlorine dioxide concentration is at least 25 ppm.

In some embodiments, the target residual chlorine dioxide concentration is determined near the surface (e.g., within 1 inch, 2 inches, 3 inches, 4 inches, 5 inches, 6 inches, 12 inches, or 18 inches of the surface) of a body of water to which chlorine dioxide (e.g., a concentrated liquid solution of chlorine dioxide) has been added. In some embodiments, a method disclosed herein comprises assessing residual chlorine dioxide concentration in the aqueous chlorine dioxide treatment solution at the conclusion of a minimum contact time. This allows verification that the aqueous chlorine dioxide treatment solution comprises the residual chlorine dioxide concentration. In some embodiments, one or more steps of the method is repeated until the residual chlorine dioxide concentration has been achieved.

In some embodiments, said assessing comprises comprises inserting an electrochemical probe into the aqueous chlorine dioxide treatment solution. Such a probe can be used to assess the chlorine dioxide residual at one or a plurality of locations in the aqueous chlorine dioxide treatment solution.

Preferably, the method comprises verifying that the residual chlorine dioxide concentration has been achieved at all locations tested. In alternative embodiments, the method comprises verifying that the residual chlorine dioxide concentration has been achieved based on the average or median value for all locations tested. As a person of skill in the art would recognize, the average residual should be used if the values are normally distributed and the median residual should be used if the values are not normally distributed.

In some embodiments, the probe is an ORP probe. In some embodiments, the probe is an electrochemical probe for use with the Palintest CHLORDIOX® Plus measuring device. In some embodiments, said assessing comprises inserting an electrochemical probe into the aqueous chlorine dioxide treatment solution and measuring the chlorine dioxide concentration of the aqueous chlorine dioxide treatment solution, e.g., using the Palintest CHLORDIOX® Plus measuring device.

In some embodiments, the assessing is performed by assessing residual chlorine dioxide concentration in a verification sample taken from the aqueous chlorine dioxide treatment solution at the conclusion of a minimum contact time.

In some embodiments, a method disclosed herein further comprises assessing residual chlorine dioxide concentration in a verification sample taken from the aqueous chlorine dioxide treatment solution at the conclusion of the minimum contact time. This allows verification that the aqueous chlorine dioxide treatment solution comprises the residual chlorine dioxide concentration.

In some embodiments, the verification sample comprises a plurality of samples. In some embodiments, the members of the plurality of samples are taken from different sampling locations in the aqueous chlorine dioxide treatment solution (e.g., at different locations in the body of water to which the concentrated liquid chlorine dioxide has been added).

Preferably, the method comprises verifying that the residual chlorine dioxide concentration has been achieved at all sampling locations. In alternative embodiments, the method comprises verifying that the residual chlorine dioxide concentration has been achieved based on the average or median value for all sampling locations tested. As a person of skill in the art would recognize, the average residual should be used if the values are normally distributed and the median residual should be used if the values are not normally distributed.

In some embodiments, the method further comprises collecting the verification sample from the aqueous treatment solution at the conclusion of the minimum contact time.

The chlorine dioxide concentration in the verification sample can be assessed, e.g., using methods disclosed herein or methods known in the art, such as, e.g., by using Method 4500-ClO2 E, an electrochemical probe, testing of the ORP, and/or iodometric titration. In some embodiments, assessing residual chlorine dioxide concentration in the verification sample comprises testing the ORP of the verification sample.

In some embodiments, assessing residual chlorine dioxide concentration in the verification sample comprises testing the chlorine dioxide concentration in the verification sample using iodometric titration.

In some embodiments, assessing residual chlorine dioxide concentration in the verification sample comprises testing the chlorine dioxide concentration in the verification sample using the Palintest CHLORDIOX® Plus electrochemical measuring device.

In another aspect provided herein is a method of treating a body of water containing a mosquito larva, the method comprising (a) taking a sample from a body of water containing a mosquito larva, (b) determining an estimated demand of the body of water by assessing demand in the sample, (c) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, wherein determining the dose comprises summing the estimated demand with a target residual chlorine dioxide concentration of at least 2.5 ppm, and (d) adding a volume of a concentrated liquid chlorine dioxide solution comprising at least 500 ppm chlorine dioxide into the body of water thereby forming an aqueous chlorine dioxide treatment solution, wherein said volume is calculated to initially provide said dose in the aqueous chlorine dioxide treatment solution.

In some embodiments, the target residual chlorine dioxide concentration is 2.5 to 50 ppm. In some embodiments, the target residual chlorine dioxide concentration is at least 5 ppm. In some embodiments, the target residual chlorine dioxide concentration is 5 to 25 ppm. In some embodiments, the target residual chlorine dioxide concentration is 5 to 15 ppm. In some embodiments, the target residual chlorine dioxide concentration is at least 10 ppm. In some embodiments, the target residual chlorine dioxide concentration is at least 25 ppm.

In some embodiments, the method comprises spraying at least part of said volume over the body of water. In some embodiments, the method comprises spraying said volume over the body of water.

In some embodiments, the method comprises agitating the body of water during or after adding the concentrated liquid chlorine dioxide solution. In some embodiments, the method comprises agitating the aqueous chlorine dioxide treatment solution during (e.g., throughout) a minimum contact time (e.g., a minimum contact time disclosed herein).

In some embodiments, the method further comprises assessing residual chlorine dioxide concentration in the aqueous chlorine dioxide treatment solution at the conclusion of a minimum contact time (e.g., a minimum contact time of 5 minutes). This allows verification that the residual chlorine dioxide concentration in the aqueous chlorine dioxide treatment solution has reached at least the target residual chlorine dioxide concentration.

In some embodiments, the minimum contact time is 5 minutes to 12 hours. In some embodiments, the minimum contact time is 10 minutes to 12 hours. In some embodiments, the minimum contact time is 10 minutes. In some embodiments, the minimum contact time is 15 minutes. In some embodiments, the minimum contact time is 20 minutes. In some embodiments, the minimum contact time is 30 minutes. In some embodiments, the minimum contact time is 45 minutes. In some embodiments, the minimum contact time is 1 hour. In some embodiments, the minimum contact time is 2 hours. In some embodiments, the minimum contact time is 4 hours, 6 hours, 8 hours, or 12 hours. In some embodiments, the minimum contact time is 24 hours.

In another aspect provided herein is method of treating a body of water containing a mosquito larva, the method comprising (a) determining an estimated demand of a body of water containing a mosquito larva by assessing demand in a sample taken from the body of water, (b) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, wherein determining the dose comprises summing the estimated demand with a target residual chlorine dioxide concentration (e.g., a target residual chlorine dioxide concentration of at least 2.5 ppm), and (c) adding a volume of a concentrated liquid chlorine dioxide solution comprising at least 500 ppm chlorine dioxide into the body of water, thereby forming an aqueous chlorine dioxide treatment solution, wherein said volume is calculated to initially provide said dose in the aqueous chlorine dioxide treatment solution.

In some embodiments, the target residual chlorine dioxide concentration is 2.5 to 50 ppm. In some embodiments, the target residual chlorine dioxide concentration is at least 5 ppm. In some embodiments, the target residual chlorine dioxide concentration is 5 to 50 ppm. In some embodiments, the target residual chlorine dioxide concentration is at least 10 ppm. In some embodiments, the target residual chlorine dioxide concentration is 10 to 50 ppm. In some embodiments, the target residual chlorine dioxide concentration is at least 25 ppm. In some embodiments, the target residual chlorine dioxide concentration is 25 to 50 ppm.

In some embodiments, the target residual chlorine dioxide concentration is 5 to 25 ppm.

In some embodiments, the target residual chlorine dioxide concentration is 5 to 15 ppm.

In some embodiments, the method further comprises assessing residual chlorine dioxide concentration in the aqueous chlorine dioxide treatment solution at the conclusion of a minimum contact time (e.g., of 5 minutes) and verifying that the treated body of water has a residual chlorine dioxide concentration of at least the target residual chlorine dioxide concentration. In such embodiments, the minimum contact time starts once the volume of concentrated liquid chlorine dioxide has been added into the body of water.

In some embodiments, the minimum contact time is 5 minutes to 12 hours. In some embodiments, the minimum contact time is 10 minutes to 12 hours. In some embodiments, the minimum contact time is 10 minutes. In some embodiments, the minimum contact time is 15 minutes. In some embodiments, the minimum contact time is 20 minutes. In some embodiments, the minimum contact time is 30 minutes. In some embodiments, the minimum contact time is 45 minutes. In some embodiments, the minimum contact time is 1 hour. In some embodiments, the minimum contact time is 2 hours. In some embodiments, the minimum contact time is 4 hours, 6 hours, 8 hours, or 12 hours. In some embodiments, the minimum contact time is 24 hours.

In another aspect provided herein is a method of treating a body of water containing a mosquito larva, the method comprising (a) measuring an initial ORP in the body of water prior to treatment, (b) adding a concentrated liquid solution of chlorine dioxide to the body of water thereby forming a treated body of water, (c) monitoring ORP in the treated body of water during the adding, and (d) ceasing the adding when the ORP in the treated body of water (or a portion thereof, e.g., the water within 1 inch, 2 inches, 3 inches, 4 inches, 5 inches, 6 inches, 12 inches, or 18 inches of the surface) reaches a level indicates that a residual concentration of chlorine dioxide (e.g., of at least 2.5 ppm) is present in the water. In some embodiments, the monitoring is performed continuously. In some embodiments, the monitoring is performed at intervals of at least once every 1, 2, 3, 4, 5, 6, 7, 8, 9 or 10 minutes. In some embodiments, said level is greater than 650 mV. In some embodiments, said level is greater than 700 mV. In some embodiments, said level is greater than 750 mV.

In some embodiments, the method comprises spraying at least part (e.g., most or all) of the concentrated liquid solution of chlorine dioxide over the body of water.

In some embodiments, the method comprises agitating the body of water during or after adding the concentrated liquid chlorine dioxide solution. In some embodiments, the method comprises agitating the treated body of water or a portion thereof (e.g., the water near the surface of the body of water, e.g., the water within 1 inch, 2 inches, 3 inches, 4 inches, 5 inches, 6 inches, 12 inches, or 18 inches of the surface) for a minimum contact time (e.g., a minimum contact time disclosed herein).

In some embodiments, the method comprises other steps or features disclosed herein.

In some embodiments, administration of chlorine dioxide as described herein is performed before sunrise or after sunset. Avoiding daytime administration can serve to prevent photochemical degradation of chlorine dioxide due to sunlight exposure.

In some embodiments, a method disclosed herein is carried out at a temperature of at least 15° C., 20° C. or 25° C. In certain embodiments, a method disclosed herein is carried out at a temperature of at least 25° C.

EXAMPLES

Example 1

Inactivation of Mosquito Larvae Using a Chlorine Dioxide Treatment Solution Comprising a Residual Concentration of 10 ppm Chlorine Dioxide To test whether chlorine dioxide would be effective in inactivating mosquito larvae, a concentrated liquid solution of chlorine dioxide was added to samples of pond water in which mosquito larvae were present. Mosquito larvae (*Culex* larvae) were obtained from Sachs Systems Aquaculture (St. Augustine, Fla.) and placed into pond water to simulate their natural environment. Before placing the mosquito larvae into the pond water and before treating the pond water with chlorine dioxide, samples of the pond water were tested to estimate the chlorine dioxide demand of the pond water.

To prepare a concentrated aqueous solution of chlorine dioxide for use in this example, an aqueous solution of 25% sodium chlorite was slowly acidified with 6 N hydrochloric acid to generate $ClO_2$ gas in the headspace of a reaction flask. The gas was ultimately passed through a column of deionized water to create a concentrated liquid (aqueous) solution. The concentration of chlorine dioxide in the solution was analytically determined using standard iodometric titration. In brief, a sample of the concentrated chlorine dioxide solution was introduced to a volume of pH 7 buffered deionized water containing potassium iodide with the addition of starch as a colorimetric indicator. Sodium thiosulfate (STS) was then added dropwise to the solution, while gently stirring, until a loss of color was observed signifying that the endpoint had been reached. Using molar equivalency equations, the concentration of chlorine dioxide in the solution was calculated. After dosing a volume of pond water with the concentrated chlorine dioxide solution, the residual concentration of chlorine dioxide was determined using iodometric titration. Similarly, iodometric titration was used to assess the demand of dilution water (which in this example was pond water). Additionally, the oxidation reduction potential (ORP) was assessed using an ORP meter from HANNA® Instruments.

Two groups of live larvae (n=10/group) were each placed into a volume of pond water. The dose of chlorine dioxide to be initially established in the treated pond water was determined by adding the estimated demand of the pond water (which was 10 ppm) to the desired residual chlorine dioxide concentration (which was 10 ppm for one group and 20 ppm for the other group). A treatment volume of concentrated aqueous chlorine dioxide solution was then calculated and added to the pond water in which larvae (n=10 per group) had been placed so as to achieve this chlorine dioxide dose (20 ppm or 30 ppm). The larvae were assessed following 10 minutes of exposure to the chlorine dioxide treatment solution in the dark. At the end of the 10 minute contact time, larvae were assessed. Larvae were considered to have been inactivated (or killed) when they showed lack of visible motion as assessed by visual observation with the naked eye and under a light microscope at 10× magnification.

The results are shown in Table 1. The actual chlorine dioxide residual concentrations in the treated water at the conclusion of the 10 minute contact time were 10 ppm and 14 ppm. These residual concentrations resulted in 100% kill of the mosquito larvae.

TABLE 1

Results of treating mosquito larvae in pond water with concentrated liquid solution of chlorine dioxide

| CONTACT TIME (min) | LARVA SIZE (mm) | $ClO_2$ DOSE (ppm) | $ORP_i$ (mV) | $ORP_f$ (mV) | $ClO_2$ RESIDUAL (ppm) | MORTALITY (%) |
|---|---|---|---|---|---|---|
| 10 | 5 | 20 | 270 | 735 | 10 | 100 |
| 10 | 10 | 30 | 368 | 742 | 14 | 100 |

Example 2

Inactivation of Mosquito Larvae Using a Chlorine Dioxide Treatment Solution Comprising a Residual Concentration of 25 ppm Chlorine Dioxide Further experiments were performed to verify inactivation of mosquito larvae in response to chlorine dioxide treatment. Four identical groups (experimental replicates) of larvae (n=15/group) were placed into pond water to which a concentrated aqueous solution of chlorine dioxide was added to form a treatment solution. In the control group (n=15 larvae), the concentrated aqueous solution of chlorine dioxide was not added but an equivalent volume of deionized water was added as a control treatment solution. All larvae were incubated for 10 minutes at room temperature (about 25° C.) in their respective treatment solutions. Immediately at the conclusion of the 10 minute contact time, all of the larvae were removed from these treatment solutions and transferred to 50 mm Petri dishes; the treatment solutions were replaced with pond water.

All larvae were assessed at the conclusion of the 10-minute contact time. Additionally, all larvae were assessed at 60 and 120 minutes after the initial addition of chlorine dioxide (or deionized water). Assessments were carried out by an analyst blind to the treatment condition.

The methods for preparation of the concentrated solution and for determining chlorine dioxide concentration, demand of the dilution water, residual chlorine dioxide concentrations, and ORP were as described in Example 1. In addition, an automated electrochemical probe (Palintest ChlordioX® Plus device, which can be used to measure residuals of <50 ppm) was used to measure residual concentrations of chlorine dioxide. Mosquito larvae (*Culex* larvae) were obtained from Sachs Systems Aquaculture (St. Augustine, Fla.). The methods for assessing larval inactivation (killing) were as described in Example 1.

Results are shown in the FIGURE and Table 2. Table 2 provides the analytically determined treatment parameters. Residual $ClO_2$ concentration, ORP, temperature, and pH were each measured in the dilution water in which mosquito larvae had been placed (pond water) prior to dosing with $ClO_2$ ($t_0$) and immediately following the 10-minute contact time ($t_{10}$). The measured values, tabulated in Table 2, represent the average of the four replicate dosing experiments. During each experiment, changes in water chemistry were measured in triplicate and are reported as the average± one standard deviation.

The residual chlorine dioxide concentration in the treatment solution immediately after the 10-minute contact time was 25 ppm. The FIGURE shows that complete larval inactivation (killing) was observed after 60 minutes, with most larvae dead after only 10 minutes of exposure. Data are presented as the mean± standard deviation (SD) for the $ClO_2$ exposure groups; no SD was measurable for the single control group. Due to the impracticality of carrying out scores of individual exposure experiments, if the control group is treated as if it had n=60 for the purpose of statistical interpretation, the complete $ClO_2$ larval killing observed at 60 minutes has a 95% confidence interval of 92.5-100% mortality.

These results confirm that exposing mosquito larvae to an aqueous chlorine dioxide treatment solution is effective to inactivate mosquito larvae.

TABLE 2

Analytical results:

| $ClO_2$ Dose Administered (ppm) | $ClO_2$ Residential (ppm) | | ORP (mV) | | Temperature (° C.) | | pH | |
|---|---|---|---|---|---|---|---|---|
| | Titration | Palintest | $t_0$ | $t_{10}$ | $t_0$ | $t_{10}$ | $t_0$ | $t_{10}$ |
| 0 | 0.0 | <0.02 ± .0 | 445 ± 1 | 462 ± 8 | 24.9 ± 0.0 | 24.9 ± 0.1 | 7.7 ± 0.0 | 7.8 ± 0.2 |
| 80 | 25.9 ± 5.1 | 26.3 ± 8.2 | 445 ± 5 | 737 ± 8 | 25.0 ± 0.1 | 24.7 ± 0.3 | 7.7 ± 0.0 | 7.0 ± 0.0 |

The relevant teachings of all patents, published applications and references cited herein are incorporated by reference in their entirety.

Without further description, it is believed that one of ordinary skill in the art can, using the preceding description and the illustrative examples, make and utilize the compounds of the present invention and practice the claimed methods. It should be understood that the foregoing discussion and examples merely present a detailed description of certain preferred embodiments. It will be apparent to those of ordinary skill in the art that various modifications and equivalents can be made without departing from the spirit and scope of the following claims.

The invention claimed is:

1. A method of treating a body of water containing a mosquito larva, the method comprising
   (a) determining an estimated demand of a body of water containing a mosquito larva by assessing demand in a sample taken from the body of water,
   (b) determining, based on the estimated demand and a target residual chlorine dioxide concentration, a dose of chlorine dioxide to be established in an aqueous chlorine dioxide treatment solution to be formed by adding a concentrated liquid chlorine dioxide solution to the body of water, wherein determining the dose comprises summing the estimated demand with a target residual chlorine dioxide concentration of at least 5 ppm, and
   (c) adding a volume of a concentrated liquid chlorine dioxide solution comprising at least 500 ppm chlorine dioxide into the body of water, thereby forming the aqueous chlorine dioxide treatment solution, wherein said volume is calculated to initially provide said dose in the aqueous chlorine dioxide treatment solution.

2. A method of treating a body of water containing a mosquito larva, the method comprising
   (a) introducing an amount of chlorine dioxide into a body of water containing a mosquito larva, thereby forming an aqueous chlorine dioxide treatment solution, wherein said amount is calculated to initially provide a dose of chlorine dioxide in the aqueous chlorine dioxide treatment solution, wherein the dose is calculated by summing an estimated demand of the body of water with a target residual chlorine dioxide concentration of at least 5 ppm and
   (b) exposing the larva to the aqueous chlorine dioxide treatment solution for a minimum contact time of 5 minutes, wherein the aqueous chlorine dioxide treatment solution comprises a residual chlorine dioxide concentration of at least 5 ppm at the conclusion of the minimum contact time.

3. A method of inactivating at least 90% of a population of mosquito larvae within 10 minutes, the method comprising exposing the population of mosquito larvae to an aqueous chlorine dioxide treatment solution for a minimum contact time of 10 minutes, wherein the aqueous chlorine dioxide treatment solution comprises a residual chlorine dioxide concentration of 5 ppm to 50 ppm at the conclusion of the minimum contact time.

4. The method of claim 3, wherein the residual chlorine dioxide concentration at the conclusion of the minimum contact time is 5 ppm to 25 ppm.

5. The method of claim 3, wherein the residual chlorine dioxide concentration at the conclusion of the minimum contact time is 5 ppm to 10 ppm.

6. The method of claim 3, wherein the residual chlorine dioxide concentration at the conclusion of the minimum contact time is 10 ppm to 50 ppm.

7. The method of claim 4, wherein the residual chlorine dioxide concentration at the conclusion of the minimum contact time is 10 ppm to 25 ppm.

8. The method of claim 3, further comprising making the aqueous chlorine dioxide treatment solution by adding to dilution water a concentrated liquid chlorine dioxide solution comprising at least 500 ppm chlorine dioxide, wherein the dilution water is a body of water in which the population of mosquito larvae is present.

9. The method of claim 3, further comprising making the aqueous chlorine dioxide treatment solution by adding to dilution water a concentrated liquid chlorine dioxide solution comprising at least 500 ppm chlorine dioxide and chlorite, wherein the ratio of chlorite:chlorine dioxide is 1:4 to 1:15 (w/w).

10. The method of claim 3, further comprising making the aqueous chlorine dioxide treatment solution by adding to dilution water a concentrated liquid chlorine dioxide solution that is initially prepared such that it comprises 1000 to 3000 ppm chlorine dioxide and 100 to 1000 ppm chlorite and has a pH of 5 to 6, wherein the concentrated liquid chlorine dioxide solution is used within 90 days of its preparation.

11. The method of claim 8, further comprising (i) determining an estimated demand of the dilution water by assessing demand in a sample of the dilution water that is collected before the concentrated liquid chlorine dioxide solution is added to the dilution water, (ii) determining, by summing the estimated demand of the dilution water with a target residual chlorine dioxide concentration, a dose of chlorine dioxide to be established in the aqueous chlorine dioxide treatment solution and (iii) adding to the dilution water a volume of concentrated liquid chlorine dioxide solution that is calculated to initially provide said dose of chlorine dioxide in the aqueous chlorine dioxide treatment solution.

12. The method of claim 8, wherein the target residual chlorine dioxide concentration is 5 to 25 ppm.

13. The method of claim 8, wherein the target residual chlorine dioxide concentration is 5 to 15 ppm.

14. The method of claim 8, wherein the target residual chlorine dioxide concentration is 10 ppm to 50 ppm.

15. The method of claim 3, wherein the method comprises spraying a concentrated liquid chlorine dioxide solution over a body of water containing mosquito larvae.

16. The method of claim 15, further comprising agitating the body of water during or after the spraying.

17. The method of claim 3, wherein the method further comprises assessing the residual chlorine dioxide concentration at the conclusion of the minimum contact time.

* * * * *